US008538745B2

(12) United States Patent
Oya et al.

(10) Patent No.: US 8,538,745 B2
(45) Date of Patent: Sep. 17, 2013

(54) CREATING A TERMS DICTIONARY WITH NAMED ENTITIES OR TERMINOLOGIES INCLUDED IN TEXT DATA

(75) Inventors: Hiroki Oya, Yamato (JP); Daisuke Takuma, Sagamihara (JP); Hirobumi Toyoshima, Machida (JP)

(73) Assignee: International Business Machines Corporation, Armonk, NY (US)

( * ) Notice: Subject to any disclaimer, the term of this patent is extended or adjusted under 35 U.S.C. 154(b) by 928 days.

(21) Appl. No.: 12/651,509

(22) Filed: Jan. 4, 2010

(65) Prior Publication Data

US 2010/0174528 A1 Jul. 8, 2010

(30) Foreign Application Priority Data

Jan. 5, 2009 (JP) ................................. 2009-000192

(51) Int. Cl.
G06F 17/21 (2006.01)
G06F 17/27 (2006.01)

(52) U.S. Cl.
USPC ................................................ 704/10; 704/9

(58) Field of Classification Search
USPC .......................................................... 704/9
See application file for complete search history.

(56) References Cited

U.S. PATENT DOCUMENTS

| 7,672,833 | B2 * | 3/2010 | Blume et al. ..................... 704/10 |
| 2004/0073548 | A1 * | 4/2004 | Lim et al. ........................... 707/5 |
| 2006/0047500 | A1 * | 3/2006 | Humphreys et al. .............. 704/9 |
| 2007/0067280 | A1 * | 3/2007 | Zhou et al. ........................ 707/5 |
| 2008/0005051 | A1 * | 1/2008 | Turner et al. ..................... 706/20 |
| 2009/0006078 | A1 * | 1/2009 | Selegey et al. .................... 704/9 |
| 2010/0161314 | A1 * | 6/2010 | Karttunen et al. ................ 704/9 |

FOREIGN PATENT DOCUMENTS

| JP | 11134334 A | 5/1999 |
| JP | 2004-265440 | 9/2004 |
| JP | 2004-341791 | 12/2004 |
| JP | 2007-011892 | 1/2007 |
| JP | 2008003656 A | 1/2008 |
| JP | 2008198132 A | 8/2008 |

OTHER PUBLICATIONS

Settles, "Biomedical Named Entity Recognition Using Conditional Random Fields and Rich Feature Sets," [online] Proc. NLPBA/COLING 2004.

* cited by examiner

*Primary Examiner* — Samuel G Neway
(74) *Attorney, Agent, or Firm* — Terry J. Carroll; Edell, Shapiro & Finnan, LLC

(57) ABSTRACT

A computer system of an embodiment of the disclosure can be used to automatically create or populate a terms dictionary using a set of computing units. A morphological analysis unit can acquire token sequence data by performing morphological analysis for the text data. A category distinguishing unit can distinguish tokens of the token sequence data by using a category dictionary to extract uncategorized words. An uncategorized-word comparing unit can compare each of the extracted uncategorized words with an uncategorized-word comparison rule to extract an uncategorized word matching the uncategorized-word comparison rule as a registration candidate word. A token-sequence comparing unit can compare a token sequence of the token sequence data with a token-sequence comparison rule to extract a token sequence matching the token-sequence comparison rule as registration candidate words. A permission unit can permit a user to select whether to register the registration candidate words in the category dictionary.

20 Claims, 5 Drawing Sheets

| CLASS OF REGISTRATION CANDIDATE WORD | CONFIDENCE FACTOR | REGISTRATION CANDIDATE WORD | | SELECTION IN CLASSIFICATION DETERMINATION |
|---|---|---|---|---|
| REGION OF BODY + "麻痺" (PARALYSIS) | HIGH | 声帯麻痺 (VOCAL CORD PARALYSIS)(TOKEN SEQUENCE) | × | NOT CLASSIFIED |
| | | 母趾麻痺 (THUMB PARALYSIS)(UNCATEGORIZED WORD) | ○ | CLASSIFIED INTO 手足麻痺 (PARALYSIS OF LIMBS) |
| | | 顔面麻痺 (FACIAL PARALYSIS)(TOKEN SEQUENCE) | × | NOT CLASSIFIED |
| | | 周期性四肢麻痺 (PERIODIC QUADRIPLEGIA)(TOKEN SEQUENCE) | ○ | CLASSIFIED INTO 手足麻痺 (PARALYSIS OF LIMBS) |
| | | 感覚麻痺 (SENSORY PARALYSIS)(TOKEN SEQUENCE) | × | NOT CLASSIFIED |
| GENERAL NOUN + "麻痺" (PARALYSIS) | MIDDLE | 不全麻痺 (INCOMPLETE PARALYSIS)(TOKEN SEQUENCE) | × | NOT CLASSIFIED |
| | | 小児麻痺 (INFANTILE PARALYSIS)(TOKEN SEQUENCE) | × | NOT CLASSIFIED |
| | | ベル麻痺 (IDIOPATHIC FACIAL PARALYSIS)(TOKEN SEQUENCE) | × | NOT CLASSIFIED |
| | | 結果麻痺 (PARALYSIS AS A RESULT)(TOKEN SEQUENCE) | × | NOT CLASSIFIED |
| OTHERS | LOW | #麻痺 (#PARALYSIS)(UNCATEGORIZED WORD) | × | NOT CLASSIFIED |
| | | て麻痺 (ND PARALYSIS)(UNCATEGORIZED WORD) | × | NOT CLASSIFIED |
| | | た麻痺 (ED PARALYSIS)(UNCATEGORIZED WORD) | × | NOT CLASSIFIED |
| | | ろ麻痺 (ING PARALYSIS)(UNCATEGORIZED WORD) | × | NOT CLASSIFIED |
| | | 31麻痺 (31 PARALYSIS)(UNCATEGORIZED WORD) | × | NOT CLASSIFIED |
| | | 2麻痺 (2 PARALYSIS)(UNCATEGORIZED WORD) | × | NOT CLASSIFIED |
| | | XY麻痺 (XY PARALYSIS)(UNCATEGORIZED WORD) | × | NOT CLASSIFIED |
| | | 央病院にて麻痺 (PARALYSIS IN HOSPITAL A)(UNCATEGORIZED WORD) | × | NOT CLASSIFIED |

FIG. 2

CREATING A TERMS DICTIONARY WITH NAMED ENTITIES OR TERMINOLOGIES INCLUDED IN TEXT DATA

CROSS-REFERENCE TO RELATED APPLICATIONS

This application claims the benefit of Japanese Patent Application No. 2009-000192 filed 5 Jan. 2009, entitled "Computer system, method, and computer program for creating terms dictionary with named entities or terminologies included in text data", which is assigned to the assignee of the present application, and the teachings of which are hereby incorporated by reference in their entirety.

BACKGROUND

The present invention relates to a computer system, a method, and a computer program for creating a terms dictionary with named entities or terminologies included in text data.

Named entity or terminology extraction is a natural language processing technique for extracting an expression or term. The expression can belong to a specific word category (for example, a person's name, a company name, a disease name, a telephone number, or a chemical compound name). The term can belong to a specific specialized field included in a body of text data. The named entity or terminology extraction is used in a wide variety of techniques, such as text mining and confidential information masking. One extraction method uses a list of expressions belonging to a vocabulary category or a terminology category as set data for an extractor of named entities or terminologies. The set data is generally referred to as "dictionary".

When a named entity or terminology is not registered in the dictionary in the execution of morphological analysis or the like, the named entity or terminology is treated as an unknown word. In context, the unknown word is a word to which a word class is not assigned in the morphological analysis. During extraction, unknown words can result in analysis error occurrences. Therefore, it is necessary to create various terms dictionaries of named entities or terminologies. Many text bodies for which extraction is used (such as a newspaper article) include a large number of named entities or terminologies. It can be difficult to manually create terms dictionaries, due to the quantity of included named entities or terminologies.

Some automated attempts (machine learning algorithms) to acquire named entities or terminologies have been attempted. A typical example is to input a morphological analysis result or a syntactic analysis result to learn a set of features. These features are able to be determined only with a word to be classified, a word adjacent to the word, and the association (conditional probability) with which the word is classified as the named entity. Such a method can determine, for example, that a word to be classified is a katakana noun and that the subsequent word represents incorporation. This type of machine learning algorithm easily enables low cost and high accuracy. The machine learning algorithm, however, is not able to ensure reliable classification and therefore it is impossible to use the machine learning algorithm in cases where omission of extraction is not permitted.

Moreover, there is a widely used method of automatically determining a word to be classified by pattern matching of regular expressions. The pattern matching, however, does not enable meaning distinction though it enables surface distinction. Therefore, the pattern matching requires a human to recheck the word in order to distinguish the meaning. In cases where the word is rechecked by a human, however, it is unadvisable to use a result of words cut out only with surface information.

Another method is to perform pattern matching of a token sequence obtained as a result of morphological analysis. In the pattern matching method, however, a pattern matched with a token sequence practically depends on peripheral information of a target of extraction and thus this method only enables the acquisition of a probabilistic result in the same manner as in the machine learning.

Still another method is to automatically obtain a vocabulary by determining word classes with respect to a combination of an unknown word and a conjunctional word of the unknown word based on a morphological analysis result of Japanese words including kana, kanji, and alphanumeric characters. The unknown word is a word to which a word class is not assigned in the morphological analysis.

Further, there is still another method including a process of manually performing editing by determining whether to include words around an unknown word as new registered words.

SUMMARY

The disclosure provides a system, a method, and a computer program for creating a terms dictionary for use in extracting named entities or terminologies in assessment operations in which omission of extraction is not permitted. The disclosure provides a system, a method, and a computer program for finding registration candidate words without exception from text data added anew and for efficiently performing the operations in constructing a terms dictionary under a word category for creating the terms dictionary. In one embodiment using details of the disclosure, disease names required for assessment operations in which omission of extraction is not permitted (such as insurance payment assessment operations by using a text mining engine such as IBM Content Analyzer (former name was IBM OmniFind® Analytics Edition)) can be automatically extracted and subsequently registered as disease names in a dictionary.

In one embodiment, the disclosure provides a computer system for creating a terms dictionary with named entities or terminologies included in text data. The computer system comprises: a morphological analysis unit for acquiring token sequence data by performing morphological analysis for the text data; a category distinguishing unit for distinguishing tokens of the token sequence data by using a category dictionary to extract uncategorized words; an uncategorized-word comparing unit for comparing each of the extracted uncategorized words with an uncategorized-word comparison rule to extract an uncategorized word matching the uncategorized-word comparison rule as a registration candidate word, wherein the uncategorized-word comparison rule includes a token composed of a first character string and a first regular expression for use in extracting the matching uncategorized word; a token-sequence comparing unit for comparing a token sequence of the token sequence data with a token-sequence comparison rule to extract a token sequence matching the token-sequence comparison rule as registration candidate words, wherein the token-sequence comparison rule includes a token sequence including a second character string and a second regular expression for use in extracting the matching token sequence; and a permission unit for permitting a user to select whether to register the registration candidate words in the category dictionary.

According to one embodiment of the disclosure, the computer system further comprises a confidence factor calculation unit for calculating a confidence factor of each of the registration candidate words, wherein the confidence factor represents a degree of probability with which the registration candidate word is registered in the category dictionary or probability with which the registration candidate word is added to the token-sequence comparison rule.

According to one embodiment of the disclosure, the confidence factor calculation unit calculates the confidence factor by using information in an external dictionary.

According to one embodiment of the disclosure, the confidence factor calculation unit calculates the confidence factor by using information on the number of characters or the types of characters.

According to one embodiment of the disclosure, the confidence factor calculation unit adds more points to the score of the confidence factor in cases where a character string in a token which matches the first or second regular expression exists in a vocabulary of a technical terminology dictionary than in cases where the character string exists in a vocabulary of a general terms dictionary.

According to one embodiment of the disclosure, the permission unit further displays the registration candidate words and the confidence factors corresponding to the registration candidate words on a display device.

According to one embodiment of the disclosure, the permission unit further sorts the registration candidate words according to the confidence factors and displays the sorted registration candidate words on the display device.

According to one embodiment of the disclosure, the computer system further comprises a registration unit for registering an uncategorized word, which is extracted as the registration candidate word and selected by the user, in the category dictionary.

According to one embodiment of the disclosure, the registration unit adds a token sequence, which is extracted as the registration candidate words and not selected by the user, to a token-sequence list.

According to one embodiment of the disclosure, the category distinguishing unit does not extract the token of the token sequence data in cases where the token has already been registered in the category dictionary.

According to one embodiment of the disclosure, the morphological analysis unit further acquires word class information corresponding to the respective tokens of the token sequence data; and the category distinguishing unit does not extract the tokens of the token sequence data in cases where the tokens of the token sequence data and the word class information corresponding to the tokens match the tokens registered in the category dictionary and the word class information corresponding to the tokens, respectively.

According to one embodiment of the disclosure, the token-sequence comparing unit does not extract the token sequence of the token sequence data in cases where the token sequence has already been registered in the token-sequence list.

According to one embodiment of the disclosure, the morphological analysis unit further acquires the word class information corresponding to the respective tokens of the token sequence data; and the token-sequence comparing unit does not extract the token sequence of the token sequence data in cases where the token sequence of the token sequence data and the word class information corresponding to the tokens of the token sequence match the token sequence registered in the token-sequence list and the word class information corresponding to the tokens of the token sequence, respectively.

According to one embodiment of the disclosure, the morphological analysis unit further acquires the word class information corresponding to the tokens of the token sequence data.

According to one embodiment of the disclosure, the morphological analysis unit further acquires the word class information corresponding to the tokens of the token sequence data; the category dictionary includes a classification category dictionary and a nontarget category dictionary; the classification category dictionary includes tokens used to retrieve the tokens under a specific category from the text data and arbitrarily includes the word class information of the tokens; and the nontarget category dictionary includes tokens used to prevent the tokens from being retrieved as tokens under a specific category from the text data and arbitrarily includes the word class information of the tokens.

According to one embodiment of the disclosure, the category distinguishing unit distinguishes the tokens of the token sequence data by using the classification category dictionary; the permission unit permits the user to select whether to register the registration candidate words in the classification category dictionary; and the registration unit registers an uncategorized word, which is extracted as the registration candidate word and selected by the user, in the category dictionary.

According to one embodiment of the disclosure, the registration unit registers a token, which is extracted as the registration candidate word and not selected by the user, in the nontarget category dictionary.

According to one embodiment of the disclosure, the category distinguishing unit does not extract the tokens of the token sequence data in cases where the tokens of the token sequence data and the word class information corresponding to the tokens match the tokens registered in the classification category dictionary and the word class information corresponding to the tokens.

According to one embodiment of the disclosure, the first or second character string is a word or a part of a word.

Further, the disclosure provides a method of creating a terms dictionary with named entities or terminologies included in text data. The method causes the computer system to perform the steps of: acquiring token sequence data by performing morphological analysis for the text data; distinguishing tokens of the token sequence data by using a category dictionary to extract uncategorized words; comparing each of the extracted uncategorized words with an uncategorized-word comparison rule to extract an uncategorized word matching the uncategorized-word comparison rule as a registration candidate word, wherein the uncategorized-word comparison rule includes a token composed of a first character string and a first regular expression for use in extracting the matching uncategorized word; comparing a token sequence of the token sequence data with a token-sequence comparison rule to extract a token sequence matching the token-sequence comparison rule as registration candidate words, wherein the token-sequence comparison rule includes a token sequence including a second character string and a second regular expression for use in extracting the matching token sequence; and permitting a user to select whether to register the registration candidate words in the category dictionary. The registration candidate words selected by the user are registered in the terms dictionary. Alternatively, the registration candidate words selected by the user in the category dictionary are registered in the terms dictionary.

According to one embodiment of the disclosure, the method is used to cause the computer system to perform the further step of calculating a confidence factor of each of the registration candidate words, wherein the confidence factor represents a degree of probability with which the registration candidate word is registered in the category dictionary or probability with which the registration candidate word is added to the token-sequence comparison rule.

According to one embodiment of the disclosure, the step of calculating the confidence factor includes a step of calculating the confidence factor by using information in an external dictionary.

According to one embodiment of the disclosure, the step of calculating the confidence factor includes a step of calculating the confidence factor by using information on the number of characters or the types of characters.

According to one embodiment of the disclosure, the step of calculating the confidence factor includes a step of adding more points to the score of the confidence factor in cases where a character string in a token which matches the first or second regular expression exists in a vocabulary of a technical terminology dictionary than in cases where the character string exists in a vocabulary of a general terms dictionary.

According to one embodiment of the disclosure, the step of permitting the selection further includes a step of displaying the registration candidate words and the confidence factors corresponding to the registration candidate words on a display device.

According to one embodiment of the disclosure, the step of permitting the selection further includes a step of sorting the registration candidate words according to the confidence factors and displaying the sorted registration candidate words on the display device.

According to one embodiment of the disclosure, the above method is used to cause the computer system to perform the step of registering an uncategorized word, which is extracted as the registration candidate word and selected by the user, in the category dictionary.

According to one embodiment of the disclosure, the step of registering includes a step of adding a token sequence, which is extracted as the registration candidate words and not selected by the user, to a token-sequence list.

According to one embodiment of the disclosure, in the step of extracting the uncategorized words, the token of the token sequence data is not extracted in cases where the token has already been registered in the category dictionary.

According to one embodiment of the disclosure, the step of acquiring further includes a step of acquiring word class information corresponding to the respective tokens of the token sequence data. Moreover, in the step of extracting the uncategorized words, the tokens of the token sequence data are not extracted in cases where the tokens of the token sequence data and the word class information corresponding to the tokens match the tokens registered in the category dictionary and the word class information corresponding to the tokens, respectively.

According to one embodiment of the disclosure, in the step of extracting the token sequence, the token sequence of the token sequence data is not extracted in cases where the token sequence has already been registered in the token-sequence list.

According to one embodiment of the disclosure, the step of acquiring further includes a step of further acquiring the word class information corresponding to the respective tokens of the token sequence data. Moreover, in the step of acquiring the token sequence, the token sequence of the token sequence data is not extracted in cases where the token sequence of the token sequence data and the word class information corresponding to the tokens of the token sequence match the token sequence registered in the token-sequence list and the word class information corresponding to the tokens of the token sequence, respectively.

According to one embodiment of the disclosure, the step of extracting the uncategorized words includes a step of distinguishing the tokens of the token sequence data by using the classification category dictionary.

According to one embodiment of the disclosure, the step of permitting includes a step of permitting the user to select whether to register the registration candidate words in the classification category dictionary.

According to one embodiment of the disclosure, the step of registering includes a step of registering an uncategorized word, which is extracted as the registration candidate word and selected by the user, in the category dictionary.

According to one embodiment of the disclosure, the step of registering includes a step of registering a token, which is extracted as the registration candidate word and not selected by the user, in the nontarget category dictionary.

According to one embodiment of the disclosure, in the step of extracting the uncategorized words, the tokens of the token sequence data are not extracted in cases where the tokens of the token sequence data and the word class information corresponding to the tokens match the tokens registered in the classification category dictionary and the word class information corresponding to the tokens, respectively.

According to one embodiment of the disclosure, the above method is used to cause the computer system to perform the step of registering an uncategorized word, which is extracted as the registration candidate word and selected by the user, in the category dictionary.

According to one embodiment of the disclosure, the step of extracting the uncategorized words includes a step of distinguishing the tokens of the token sequence data by using a classification category dictionary and a nontarget category dictionary, wherein the category dictionary includes the classification category dictionary and the nontarget category dictionary, and the classification category dictionary includes tokens used to retrieve the tokens under a specific category from the text data and arbitrarily includes the word class information of the tokens; and the step of permitting the user includes the steps of: registering an uncategorized word, which is extracted as the registration candidate word and selected by the user, in the classification category dictionary; registering an uncategorized word, which is extracted as the registration candidate word and not selected by the user, in the nontarget category dictionary; or adding the token sequence, which is extracted as the registration candidate words and not selected by the user, in the token-sequence list.

The disclosure further provides a method of creating a terms dictionary with named entities or terminologies included in text data. The method is used to cause the computer system to perform the steps of: acquiring token sequence data and word class information corresponding to the respective tokens of the token sequence data by performing morphological analysis for the text data; distinguishing the tokens of the token sequence data by using the classification category dictionary and the nontarget category dictionary to extract the uncategorized words, wherein the classification category dictionary includes tokens used to retrieve the tokens under a specific category from the text data and arbitrarily includes the word class information of the tokens and the nontarget category dictionary includes tokens not used to prevent the tokens from being retrieved as tokens under the specific category from the text data and arbitrarily includes the word class information of the tokens; comparing each of the extracted uncategorized words with an uncategorized-word comparison rule to extract an uncategorized word matching the uncategorized-word comparison rule as a registration candidate word, wherein the uncategorized-word comparison rule includes a token composed of a first character string and a first regular expression for use in extracting the matching uncategorized word; comparing a token sequence of the token sequence data with a token-sequence comparison rule to extract a token sequence matching the token-sequence comparison rule as registration candidate words, wherein the token-sequence comparison rule includes a token sequence including a second character string and a second regular expression for use in extracting the matching token sequence; calculating a confidence factor of each of the registration candidate words, wherein the confidence factor represents a degree of probability with which the registration candidate word is registered in the category dictionary or probability with which the registration candidate word is added to the token-sequence comparison rule; permitting a user to select whether to register the registration candidate words in the category dictionary, wherein the nontarget category dictionary includes tokens used to prevent the tokens from being retrieved as tokens under a specific category from the text data and arbitrarily includes the word class information of the tokens; and according to the selection by the user, registering an uncategorized word, which is extracted as the registration candidate word and selected by the user, in the classification category dictionary; registering an uncategorized word, which is extracted as the registration candidate word and not selected by the user, in the nontarget category dictionary; or adding the token sequence, which is extracted as the registration candidate words and not selected by the user, to the token-sequence list. The registration candidate words registered in the classification category dictionary are registered in the above terms dictionary. Alternatively, uncategorized words, which are extracted as the registration candidate words and selected by the user, are registered in the terms dictionary.

The disclosure further provides a computer program for creating a terms dictionary with named entities or terminologies included in text data. The computer program causes the computer system to perform the steps of one of the methods described above.

According to the embodiments of the disclosure, it is possible to perform dictionary registration in which a user is able to view all registration candidate words by adopting both advantages of the cutout of a token sequence by the morphological analysis and a wide coverage of extraction with an application of a token and a token sequence to a rule. Moreover, according to the embodiment of the disclosure, registration candidate words are cut out in units of a word which is a morpheme. Therefore, in addition to a noise reduction, it is possible to perform a check operation which conforms to a purpose with a minimum work. Further, according to the embodiment of the disclosure, a token sequence is able to be checked in parallel with the registration, and therefore it is possible to prevent the omission of registration of a word which depends on language processing.

BRIEF DESCRIPTION OF THE DRAWINGS

FIG. 2 is a diagram illustrating a list of registration candidate words with confidence factors according to the embodiment of the present invention.

DETAILED DESCRIPTION

Figure 1A:
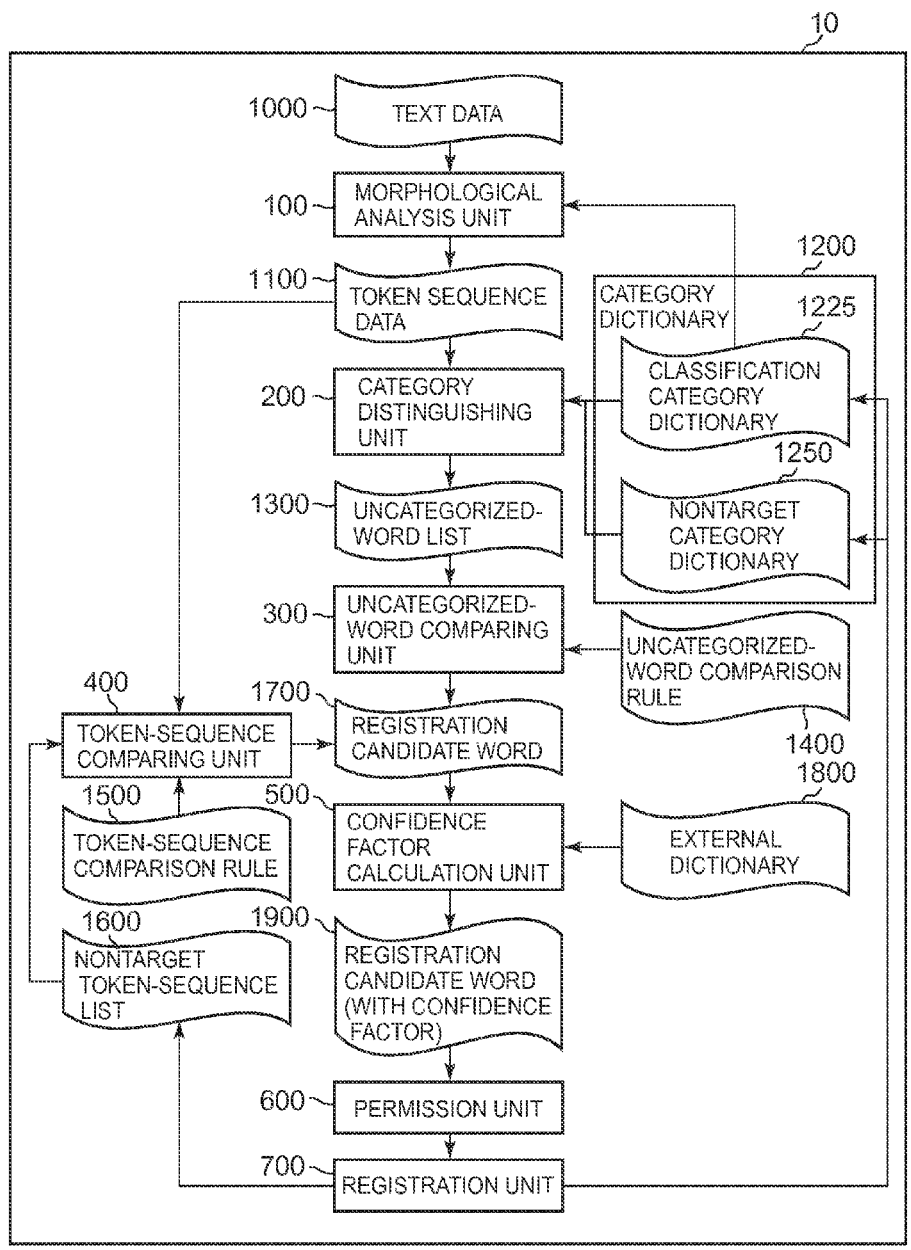
FIG. 1A is a diagram illustrating an example of a general configuration of a computer system according to an embodiment of the present invention.

In the disclosure, a named entity is a representation defined by a proper name, an organization name, a person's name, a place name, date, time, a price, a rate, or the like. The definition in the disclosure includes extended named entities. That is, the named entity list is extensible and is an open set designed to be expanded or extended in the future.

In the disclosure, a "terminology" is a lexical unit which is used and works among people in a particular discipline, people who engage in a particular profession, or people in a particular industry. Moreover, in the disclosure, the term "terminology" includes a product name, a technical name, and a customer name.

In the disclosure, text data is electronic data, and any storage format is acceptable as long as the data includes text. The text is able to include named entities or terminologies in addition to general terms. Any language is acceptable for characters embedded in the text data. The language may be Japanese, English, Chinese, Korean, or the like. The text data includes hand-written data such as data obtained by reading medical certificate data with a scanner and converted to text data with an optical character reader (OCR), and data created by application software such as word processor software, spreadsheet software, database software, and groupware. Any format of text data is acceptable as long as a morphological analysis unit is able to recognize the text data. If text data is obtained by converting hand-written characters, for example, with an OCR, the text data may include wrong characters, omitted characters, unnecessary spaces, or unnecessary symbols. Also, even if text data is created by application software, the text data may include wrong characters, omitted characters, unnecessary spaces, or unnecessary symbols due to typing errors, typographical errors caused by selecting wrong kanji when word-processing, or operating errors.

In the disclosure, a morpheme is the smallest meaningful unit which generally forms a word. In Japanese, a morpheme is a word such as a noun, adjective, adverb, verb stem, ending, particle, or auxiliary verb.

In the disclosure, a morphological analysis is processing of dividing text data into words and is processing which is the most basic processing of natural language processing. The unit itself of the morpheme created by the morphological analysis may vary with the purpose of use. In the disclosure, the morphological analysis is processing of dividing text data into the smallest meaningful units each of which forms a word, analyzing declension and conjugation, and, if necessary, identifying word classes. In the disclosure, a morpheme unit cut out by the morphological analysis is referred to as a token.

Only processing of dividing words into the above units without identifying word classes is referred to as tokenizer. In the disclosure, the morphological analysis includes tokenizer. A method of the morphological analysis is not particularly limited, but it is possible to use a morphological analysis method.

In the disclosure, token sequence data is data formed of one or a plurality of morphemes cut out by the morphological analysis. A token is a morpheme. A token sequence is composed of a plurality of morphemes. In other words, the token sequence is composed of a plurality of tokens.

In the disclosure, a category dictionary includes at least tokens required to be registered in the dictionary as named entities or terminologies. In a broad sense, the category dictionary may include functions of a classification category dictionary and a nontarget category dictionary. If the category dictionary includes the classification category dictionary and the nontarget category dictionary, it is possible to distinguish a token included in the classification category dictionary from a token registered in the nontarget category dictionary using flags and to store the tokens. For example, the flag of a token included in the classification category dictionary is set to 1 and the flag of a token included in the nontarget category dictionary is set to 0.

In the disclosure, the classification category dictionary is a dictionary containing tokens which conform to an uncategorized-word comparison rule or token sequences which conform to a token-sequence comparison rule, both of which are tokens required to be registered in the terms dictionary as named entities or terminologies.

In the disclosure, the nontarget category dictionary is a dictionary containing tokens which conform to the uncategorized-word comparison rule or token sequences which conform to the token-sequence comparison rule, both of which are tokens not required to be registered in the terms dictionary as named entities or terminologies. The term "nontarget" is used because the nontarget category dictionary is used to register tokens not required to be registered in the classification category dictionary. In other words, the nontarget category dictionary is a dictionary in which tokens or token sequences not to be extracted are registered though the tokens or token sequences superficially resemble tokens or token sequences required to be extracted.

For example, in the nontarget category dictionary under the "手足麻痺" (paralysis of limbs) category, for example, "顔面麻痺" (facial paralysis) is registered. The "顔面麻痺" is thus registered in the nontarget category dictionary because "顔面麻痺" does not belong to the "手足麻痺" category though "顔面麻痺" includes "麻痺" (paralysis) which is a part of the uncategorized-word comparison rule or the token-sequence comparison rule, similarly to "拇指麻痺" (thumb paralysis) and "両腕麻痺" (paralysis of both arms) required to be extracted.

In the disclosure, an uncategorized word is a token not registered in the category dictionary, where tokens of token sequence data are distinguished by using the category dictionary. Alternatively, an uncategorized word is a token not registered in either of the classification category dictionary and the nontarget category dictionary, where tokens of token sequence data are distinguished by using the classification category dictionary and the nontarget category dictionary.

In the disclosure, the uncategorized-word comparison rule is used to extract a registration candidate word from uncategorized words. The uncategorized-word comparison rule includes a token composed of a first character string and a first regular expression (any order is acceptable).

In the disclosure, the first character string constitutes a part of a rule included in the uncategorized-word comparison rule and is a character string which forms the entire word or a character string which forms a part of the word.

In the disclosure, the first regular expression constitutes a part of a rule included in the uncategorized-word comparison rule and is a notation of expressing a character string pattern so as to be used for retrieving a character string. The use of the regular expression enables the specification of a "feature" (pattern) without directly specifying a character string and therefore enables the retrieval with variants of notation absorbed.

In the disclosure, the token-sequence comparison rule is used to extract a predetermined token sequence as registration candidate words from token sequence data. The token-sequence comparison rule includes a token sequence composed of a token of a second character string and a token of a second regular expression (any order is acceptable).

In the disclosure, the second character string constitutes a part of a rule included in the token-sequence comparison rule and is a character string which forms the entire word or a character string which forms a part of the word.

In the disclosure, the second regular expression constitutes a part of a rule included in the token-sequence comparison rule and is a notation for expressing a character string pattern so as to be used for retrieving a character string. The use of the regular expression enables the specification of a "feature" (pattern) without directly specifying a character string and therefore enables the retrieval with variants of notation absorbed.

In the disclosure, a token-sequence list is also referred to as a nontarget token-sequence list. The nontarget token-sequence list is a dictionary listing token sequences (not tokens, but token sequences) not required to be registered as named entities or terminologies in the dictionary. The term "nontarget" is used because the nontarget token-sequence list is for use in registering tokens not required to be registered in the classification category dictionary.

In the disclosure, a confidence factor represents a degree of probability with which a word or the like is registered in the category dictionary. Alternatively, the confidence factor represents a degree of probability with which a word or the like is registered in the classification category dictionary. The confidence factor is able to be represented by, for example, a numerical value, a level, or the like.

Hereinafter, the disclosure will be described with reference to accompanying drawings. It is here to be understood that this embodiment is merely illustrative of the preferred aspect of the present invention, but is not intended to limit the scope of the invention. Unless otherwise specified in the following figures, the same reference numerals are used to refer to the same components.

Referring to FIG. 1A, there is shown an example of the entire configuration of a computer system according to the embodiment of the present invention.

A computer system 10 includes a morphological analysis unit 100, a category distinguishing unit 200, an uncategorized-word comparing unit 300, a token-sequence comparing unit 400, a confidence factor calculation unit 500, a permission unit 600, a registration unit 700, and/or other such components.

In addition, the computer system 10 stores text data 1000, token sequence data 1100, a classification category dictionary 1225, a nontarget category dictionary 1250, an uncategorized-word list 1300, an uncategorized-word comparison rule 1400, a token-sequence comparison rule 1500, a nontarget token-sequence list 1600, a registration candidate word 1700, an external dictionary 1800, and a registration candidate word 1900 in its storage medium (not shown) such as a hard disk or flash memory drive (e.g., solid state disk (SSD)) or in a storage medium to which the computer system 10 is acceptable, such as a network disk.

Hereinafter, the above components 100 to 700 will be described taking an example of creating a dictionary for determining whether a symptom described in a payment application form relates to "手足麻痺" (paralysis of limbs) in life insurance payment assessment.

In creating a terms dictionary for the above assessment, the classification category of the terms dictionary is "手足麻痺" (paralysis of limbs). Therefore, the classification category dictionary 1225 relates to "手足麻痺" (paralysis of limbs). In the creation of the terms dictionary, a word (token) "麻痺" (paralysis) is exhaustively checked from the text data 1000 and the classification category dictionary 1225 for words related to "手足麻痺" is used. Moreover, the nontarget category dictionary 1250 for words not related to "手足麻痺" though related to "麻痺" and the nontarget token-sequence list 1600 related to "麻痺" are used to decrease the number of words (tokens or token sequences) extracted as registration candidate words. The term "nontarget" here means that the word is not to be registered in the classification category dictionary 1225.

The morphological analysis unit 100 performs a morphological analysis of the sentences in input text data 1000 in response to the input of the text data 1000.

Examples of the text data 1000 are as follows:

Example 1

4月1日顏面麻痺で来院 (Came to the Hospital with Facial Paralysis on April 1st.)

Example 2

4月1日拇指麻痺で来院 (Came to the Hospital with Thumb Paralysis on April 1st.)

Example 3

診察の結果麻痺 で来院 (Came to the Hospital with Paralysis as a Result of Medical Examination.)

Example 4

再度麻痺で来院 (Came to the Hospital with Paralysis Again.)

Although the text data 1000 is a sentence having a meaning in the above examples, some text data may include wrong characters, omitted characters, unnecessary spaces or the like. For example, there may be the following sentences:
1. "4月1日 顏面魔痺で来院" (a wrong character "魔" is used instead of "麻");
2. "4月1日顏面痺で来院" ("麻" is omitted); and
3. "4月1日顏面麻 痺で来院" (a space is placed between "麻" and "痺").

The morphological analysis unit 100 outputs token sequence data 1100 for each sentence as a result of the morphological analysis. In the morphological analysis, where a token sequence is divided depends on the interpretation of each sentence by the morphological analysis unit 100 or depends on technical restrictions of the morphological analysis unit 100. The morphological analysis unit 100 analyzes only morphemes, but does not analyze the categories of morphemes.

In outputting the token sequence data 1100, declinable-word conjugation is standardized before output. The output may further include word class information. The word class information is, for example, a date, noun, adjective, adverb, verb stem, ending, particle, auxiliary verb, or unknown word. The unknown word is a new expression which is not registered in a dictionary.

If the above output is token sequence data and word class information corresponding to respective tokens, the token sequence data and the word class information are output as a series of pairs of a token and word class information thereof.

Examples of the token sequence data (1100) are as follows:
When word class information is not included:

Example 1

4月1日/顏面/麻痺/で/来院

Example 2

4月1日/拇指麻痺/で/来院

Example 3

診察/の/結果/麻痺/で/来院

Example 4

再度/麻痺/で/来院

When word class information is included:

Example 1

4月1日(日付)/顏面(名詞)/麻痺(名詞)/で(助詞)/来院(名詞) [4月1日 (date)/顏面 (noun)/麻痺 (noun)/で (particle)/来院 (noun)]

Example 2

4月1日(日付)/拇指麻痺(未知語)/で(助詞)/来院(名詞) [4月1日 (Date)/拇指麻痺 (Unknown Word)/で (Particle)/来院 (Noun)]

Example 3

診察(名詞)/の(助詞)/結果(名詞)/麻痺(名詞)/で(助詞)/来院(名詞) [診察 (Noun)/の (Particle)/結果 (Noun)/麻痺 (Noun)/で (Particle)/来院 (Noun)]

Example 4

再度(副詞)/麻痺(名詞)/で(助詞)/来院(名詞) [再度 (Adverb)/麻痺 (Noun)/で (Particle)/来院 (Noun)]

The morphological analysis unit 100 sends the token sequence data 1100 composed of a token or a pair of a token and word class information to the category distinguishing unit 200 and the token-sequence comparing unit 400. Processing in the category distinguishing unit 200 is able to be performed in parallel with processing in the token-sequence comparing unit 400.

The category distinguishing unit 200 compares all tokens in the token sequence data 1100 with entries in a category dictionary 1200 and extracts uncategorized words which do not match the entries. The category dictionary 1200 includes, for example, the function of the classification category dictionary 1225 and the function of the nontarget category dictionary 1250.

The classification category dictionary 1225 is an entry set which includes tokens belonging to a predetermined category and arbitrarily includes word class information corresponding to the tokens. The classification category dictionary 1225 has tokens belonging to the classification category "手足麻痺" (paralysis of limbs) such as "両腕麻痺" (paralysis of both arms).

The nontarget category dictionary 1250 is an entry set which includes tokens not to be registered in the classification category dictionary 1225 and arbitrarily includes word class information corresponding to the tokens.

The category of the category dictionary 1200 is, for example, "手足麻痺" (paralysis of limbs).

The category distinguishing unit 200 extracts tokens as uncategorized words if the tokens in the token sequence data 1100 do not match the entries in the category dictionary. Alternatively, in cases where the category dictionary 1200 includes the function of the classification category dictionary 1225 and the function of the nontarget category dictionary 1250, the category distinguishing unit 200 extracts tokens as uncategorized words if the tokens in the token sequence data 1100 do not match the entries in the classification category dictionary 1225 and the entries in the nontarget category dictionary 1250.

The category distinguishing unit 200 adds the extracted uncategorized words to the uncategorized-word list 1300.

Examples of the uncategorized-word list 1300 are as provided below. It is assumed that the token "麻痺" (paralysis) is registered as a nontarget token with a flag in the category dictionary 1200 or registered in the nontarget category dictionary (1250).

Example 1

4月1日/顔面/で/来院

Example 2

4月1日/拇指麻痺/で/来院

Example 3

診察/の/結果/で/来院

Example 4

再度/で/来院

The uncategorized-word comparing unit 300 compares each uncategorized word in the uncategorized-word list 1300 with the uncategorized-word comparison rule 140 and determines whether each uncategorized word matches the uncategorized-word comparison rule 1400.

As long as the token is composed of a combination of a character string and a regular expression, any order is acceptable with respect to the character string and the regular expression in the combination thereof in the uncategorized-word comparison rule 1400. The uncategorized-word comparison rule includes a rule composed of a token unit (in this case, the token unit is the same as a word unit) and a rule composed of a part of a token unit (namely, a substring). The uncategorized-word comparison rule 1400 is used to extract a token which comprehensively matches a token belonging to the classification category. It is, however, assumed that a part which matches an arbitrary character string is a terminology or any other word, as described later with respect to the confidence factor calculation unit 500, and therefore it is desirable to prepare the uncategorized-word comparison rule 1400 on the premise of the assumption.

Examples of the uncategorized-word comparison rule 1400 are as follows:

"[あ-ん]*麻痺"

"[あ-ん]*麻痺" ([a-z]*paralysis) is an uncategorized-word comparison rule composed of a regular expression and a character string.

The uncategorized-word comparison rule matches a token composed of zero or more hiragana characters followed by "麻痺" (paralysis). "[○-Δ]" represents one arbitrary character whose character code is between ○ and Δ. The symbol "*" represents a repetition of the previous character composed of zero or more characters.

Example of matching:
"がんめん麻痺" (facial paralysis),
"麻痺" (paralysis),
"りょううで麻痺" (paralysis of both arms)
Example of unmatching:
"顔面麻痺" (facial paralysis),
"ベル麻痺" (idiopathic facial paralysis),
"がんめん" (facial)
"*麻痺" (*paralysis) is an uncategorized-word comparison rule composed of a regular expression (an asterisk in this example) and a character string. The asterisk represents an arbitrary character string.

Example of matching:
"母趾麻痺" (thumb paralysis),
"顔面麻痺" (facial paralysis)
Example of unmatching:
"母趾マヒ" (thumb paralysis),
"顔面まひ" (facial paralysis)
"*マヒ" (paralysis) is an uncategorized-word comparison rule composed of a regular expression (an asterisk in this example) and a character string.

Example of matching:
"母趾マヒ" (thumb paralysis)
Example of unmatching:
"母趾麻痺" (thumb paralysis),
"顔面麻痺" (facial paralysis),
"顔面まひ" (facial paralysis)
"[ア-ン|ー]++[0-9]{1,3}+mg" ([a-z|ー]++[0-9]{1,3}+mg) is an uncategorized-word comparison rule composed of a plurality of regular expressions and a plurality of character strings.

The uncategorized-word comparison rule matches a character string in which one or more katakana characters including a macron are followed by a numeral composed of one to three characters and "mg" at the end of the character string. "|" represents "or". "++" represents a repetition of the previous character composed of one or more characters. "{1,3}+" represents a repetition of the previous character by once to three times.

Example of matching:
"グルコース 120 mg" (glucose 120 mg),
"アスピリン 500 mg" (aspirin 500 mg)
Example of unmatching:
"100 mg", "アスピリン mg" (aspirin mg),
"ブドウ糖 120 mg" (glucose sugar 120 mg)
The uncategorized-word comparison rule 1400 is intended for a word. Therefore, the words previous to or subsequent to an uncategorized word are not observed by using the uncategorized-word comparison rule 1400.

The uncategorized-word comparing unit 300 outputs an uncategorized word which matches the uncategorized-word comparison rule 1400 as a registration candidate word 1700.

Examples of the results of the uncategorized-word comparison are as follows:

Example 1

Not Available

Example 2

拇指麻痺 (Thumb Paralysis)

Example 3

Not Available

Example 4

Not Available

In the above examples, "拇指麻痺" is a registration candidate word 1700.

The token-sequence comparing unit 400 sequentially reads the token sequences of the token sequence data 1100, compares the token sequences with the token-sequence comparison rule 1500, and determines whether the token sequences match the token-sequence comparison rule 1500. Subsequently, the token-sequence comparing unit 400 determines whether the entries (for example, "両腕/麻痺" of the token sequence which matches the token-sequence comparison rule 1500 exist in the nontarget token-sequence list 1600. If the entries do not exist in the nontarget token-sequence list 1600, the token-sequence comparing unit 400 outputs the token sequence as a registration candidate word 1700.

As long as the token sequence includes a token of a character string and a token of a regular expression, any order is acceptable with respect to the token of the character string and the token of the regular expression in the token sequence in the token-sequence comparison rule 1500. The token-sequence comparison rule (1500) is used to extract a token sequence which comprehensively matches a token sequence belonging to the classification category.

Examples of the token-sequence comparison rule (1500) are as follows

[あ-ん]+麻痺

"[あ-ん]+麻痺" ([a-z]+paralysis) is a token-sequence comparison rule composed of a token string including a token of a regular expression and a token of a character string. The token-sequence comparison rule matches a token sequence including zero or more hiragana characters and "麻痺" (paralysis). "+" represents a connection between the preceding token and a token following the token.

Example of matching:
"がんめん麻痺" (facial paralysis),
"りょううで麻痺" (paralysis of both arms)

Example of unmatching:
"顔面麻痺" (facial paralysis),
"ベル麻痺" (idiopathic facial paralysis),
"がんめん" (facial)

{名詞}+麻痺 ((Noun)+paralysis) is a token-sequence comparison rule composed of a token sequence including a token {名詞} and a token {麻痺}. The term {名詞} represents "noun" as a word class.

The token-sequence comparison rule 1500 may be prepared in such a way that the token-sequence comparing unit 400 considers the word classes of tokens. Note that, however, the token-sequence comparing unit 400 does not consider categories.

The token-sequence comparing unit 400 outputs a token sequence which matches the token-sequence comparison rule 1500 as a registration candidate word 1700.

Examples of the results of the token-sequence comparison are as follows:

When word class information is not included

Example 1

顔面/麻痺

Example 2

Not Available

Example 3

結果/麻痺

Example 4

Not Available

When word class information is included

Example 1

顔面{名詞}/麻痺 [顔面 (Noun)/麻痺]

Example 2

Not Available

Example 3

結果{名詞}/麻痺 [結果 (Noun)/麻痺]

Example 4

Not Available

From the above description, the registration candidate word 1700 includes a result from the uncategorized-word comparing unit 300 and a result from the token-sequence comparing unit 400.

The examples of the registration candidate word 1700 are as follows:

Result from the uncategorized-word comparing unit 300

Example 2

拇指麻痺

Result from the token-sequence comparing unit 400

Example 1

顔面/麻痺 or 顔面(名詞)/麻痺 [顔面 (Noun)/麻痺]

Example 3

結果/麻痺 or 結果(名詞)/麻痺 [結果 (Noun)/麻痺]

The confidence factor calculation unit 500 calculates confidence factors of the registration candidate words 1700 output in the uncategorized-word comparing unit 300 and in the token-sequence comparing unit 400.

In calculating the confidence factors, it is possible to use various types of information such as information in an external dictionary 1800 or other dictionaries, the number of characters or the types of characters, and the like. Examples of the information will be described below.

Whether or not the registration candidate word 1700 is a word in the external dictionary 1800 such as a specific technical terminology dictionary or a word including the word. The technical terminology dictionary includes a word representing a region of the body. For example, the word is a term representing a region of the body, a vocal cord, a thumb, a face, a limb, or the like.

Whether or not the registration candidate word 1700 is a word belonging to a specific category or a word including the word.

Example A

In the Case of "Symbol+麻痺," the Scored of the Confidence Factor is Decreased (for Example, #麻痺).

Example B

In the Case of "One Hiragana Character+麻痺," the Score of the Confidence Factor is Decreased (for Example, て麻痺).

Example C

In the Case of "Numeral+麻痺," the Score of the Confidence Factor is Decreased (for Example, 一麻痺).

Whether or not the registration candidate word (1700) is a word in a general word dictionary or a word including the word.

Example

General Noun+"麻痺"

It is possible to discriminate noise tokens determined to be uncategorized words due to an insertion of a space, a wrong character, or an omitted character from other uncategorized words by adding confidence factors also to the registration candidate words in the format of a general noun+"麻痺".

Moreover, it is possible to use weighting to calculate the confidence factor. An example of the weighting is described below.

In the case of "*麻痺" in vocabulary acquisition of "手足麻痺" (paralysis of limbs), it is possible to increase the confidence factor of the registration candidate word in the format of a region of the body+ {腕、足、 by using a dictionary, which includes a term representing a region of the body such as, for example, {腕、足、頭、心臟、---} (arm, leg, head, heart, - - - ), in a terms dictionary of general anatomy. For example, a certain number of points are added to the score of the confidence factor as a weight.

The permission unit 600 provides at least a registration candidate word list as shown in FIG. 2 and an interface for permitting a user to select whether to register registration candidate words in the category dictionary 1200. The interface is, for example, a graphical user interface (GUI) screen. If the category dictionary 1200 is divided into the classification category dictionary 1225 and the nontarget category dictionary 1250, the permission unit 600 provides at least the above registration candidate word list and an interface for permitting a user to select whether to register the registration candidate words in the classification category dictionary 1225. The interface prompts the user to select whether to manually check the registration candidate words or registration candidate words with confidence factors 1900 to register the registration candidate words in the classification category dictionary 1225.

The registration unit 700 performs the following processing in response to an input of the user selection in classification determination which has been input from the GUI screen described above.

If a registration candidate word is registered in the category dictionary 1200, in other words, if the user selects to register the registration candidate word in the classification category "手足麻痺" (paralysis of limbs), the registration unit 700 sets YES to a registration flag f.

Alternatively, if a registration candidate word is registered in the classification category dictionary 1225, in other words, if the user selects to register the registration candidate word in the classification category "手足麻痺" (paralysis of limbs), the registration unit 700 sets YES to the registration flag f.

Unless the registration candidate word is registered in the category dictionary 1200, in other words, unless the user selects to register the registration candidate word in the classification category "手足麻痺" (paralysis of limbs), the registration unit 700 sets NO to a registration flag f.

Alternatively, unless a registration candidate word is registered in the classification category dictionary 1225, in other words, unless the user selects to register the registration candidate word in the classification category "手足麻痺" (paralysis of limbs), the registration unit 700 sets NO to the registration flag f.

Upon receiving YES as the registration flag f, the registration unit 700 registers the registration candidate word in the classification category dictionary 1225.

Upon receiving NO as the registration flag f, the registration unit 700 registers the registration candidate word in the nontarget category dictionary 1250 if the registration candidate word is an uncategorized word or registers the registration candidate word in the nontarget token-sequence list 1600 if the registration candidate word is a token sequence.

In the above example, the registration unit 700 registers the registration candidate word in the classification category dictionary 1225 if YES is set to the registration flag f with respect to the registration candidate word "拇指麻痺" (thumb paralysis). Moreover, if NO is set to the registration flag f with respect to the registration candidate word "顔面麻痺" (facial paralysis), the registration unit 700 registers the registration candidate word in the nontarget token-sequence list 1600. Further, if NO is set to the registration flag f with respect to the registration candidate Word "結果麻痺" (paralysis as a result), the registration unit 700 registers the registration candidate word in the nontarget token-sequence list 1600.

Since the above word "拇指麻痺" (thumb paralysis) has been registered in the classification category dictionary 1225, the category distinguishing unit 200 does not extract the word "拇指麻痺" as an uncategorized word from the token sequence data 1100 in distinguishing in the token sequence data 1100 after the registration, and consequently the word "拇指麻痺" is not extracted as a registration candidate word. In other words, the category distinguishing unit 200 does not extract a registration candidate word registered in the classification category dictionary 1225 in the subsequent processing. This enables a reduction in user's operations of selecting whether to register the registration candidate word.

Similarly, the category distinguishing unit 200 does not extract the registration candidate word registered in the nontarget category dictionary 1250 in the subsequent processing. This enables a reduction in user's operations of selecting whether to register the registration candidate word.

Further, since the above words "顔面麻痺" (facial paralysis) and "結果麻痺" (paralysis as a result) have been registered in the classification category dictionary 1225, the token-sequence comparing unit 400 does not extract the words "顔面麻痺" and "結果麻痺" as uncategorized words from the token sequence data 1100 in distinguishing in the token sequence data 1100 after the registration, and consequently the words "顔面麻痺" and "結果麻痺" are not extracted as registration candidate words. In other words, the token-sequence comparing unit 400 does not extract registration candidate words registered in the classification category dictionary 1225 in the subsequent processing. This enables a reduction in user's operations of selecting whether to register the registration candidate words in the same manner as in the above.

Figure 1B:
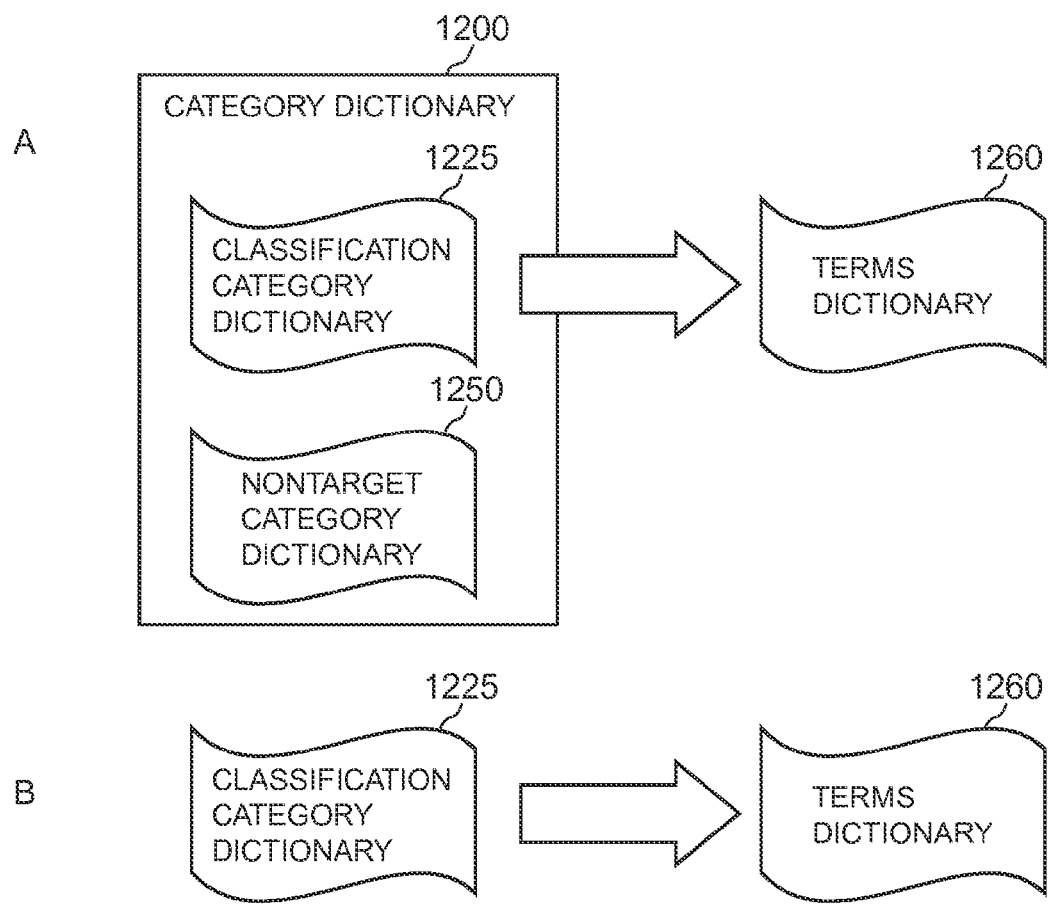
FIG. 1B is a diagram illustrating a relationship among a category dictionary, a classification category dictionary, a nontarget category dictionary, and a terms dictionary according to the embodiment of the present invention.

FIG. 1B shows a relationship among the category dictionary, the classification category dictionary, the nontarget category dictionary, and the terms dictionary according to the embodiment of the present invention.

A is a case where the category dictionary 1200 includes the function of the classification category dictionary 1225 and the function of the nontarget category dictionary 1250.

Tokens or token sequences registered in a part having the function of the classification category dictionary in the category dictionary 1200 or tokens or token sequences likely to be registered in the part having the function of the classification category dictionary in the category dictionary 1200 are registered in the terms dictionary 1260.

B is a case where the classification category dictionary 1225 is separated from the nontarget category dictionary 1250.

Tokens or token sequences registered in the classification category dictionary or tokens or token sequences likely to be registered in the classification category dictionary are registered in the terms dictionary 1260.

Moreover, the classification category dictionary itself may serve as the terms dictionary.

FIG. 2 shows a list of registration candidate words with confidence factors according to the embodiment of the present invention. The list includes at least registration candidate words and an interface for selection in classification determination. The list further arbitrarily includes the class of a registration candidate word or the confidence factor or a combination thereof. If the registration candidate word is shown with the confidence factor, the word is also referred to as the registration candidate word with the confidence factor 1900. The registration candidate word with the confidence factor 1900 may include information which has served as a ground for the confidence factor besides the confidence factor appended to the registration candidate word 1700. The information which has served as the ground for the confidence factor is, for example, the class of the registration candidate word or which of a token sequence and an uncategorized word is the registration candidate word.

The list is provided with the classes of registration candidate words as follows: a region of the body+"麻痺"; a general noun+"麻痺"; and others.

The list is provided with the confidence factors as follows: High, Middle, and Low. Alternatively, it is possible to use numerical values as the confidence factors according to the confidence factors such as, for example, 3 (corresponding to High), 2 (corresponding to Middle), and 1 (corresponding to Low) in this order. In addition, the registration candidate words are sorted according to the confidence factors. The result of the sort is displayed to the user, by which the user is able to easily determine whether to register the registration candidate word in the category dictionary 1200. Further, it is possible to collectively determine whether to register registration candidate words for each confidence factor, instead of determining whether to register each registration candidate word. The collective determination facilitates the registration in the nontarget category dictionary 1250 or in the nontarget token-sequence list 1600. Further, even if there is a seemingly difficult named entity or terminology, it is estimated more easily that the named entity or terminology represents a region of a body.

In the list, the registration candidate words are sorted in the order of confidence factor. Alternatively, the registration candidate words may be sorted for each confidence factor group.

In the list, the word "拇指麻痺" (thumb paralysis), which is a result from the uncategorized-word comparing unit 300, has a confidence factor of High and is listed on the second line from the top of the list. Moreover, in the list, the word "顔面麻痺" (facial paralysis), which is a result from the token-sequence comparing unit 400, has a confidence factor of High and is listed on the third line from the top of the list. Further, in the list, the word "結果麻痺" (paralysis as a result), which is a result from the token-sequence comparing unit 400, has a confidence factor of Middle and is listed on the ninth line from the top of the list.

The selection in classification determination is displayed by using a GUI screen. The GUI screen enables the user to select a classification determination. The selection in the classification determination is implemented by selecting, for example, ○ when selecting the word or x when not selecting the word from a pull-down menu. Alternatively, the GUI screen is displayed by selecting, for example, an option menu.

Figure 3:
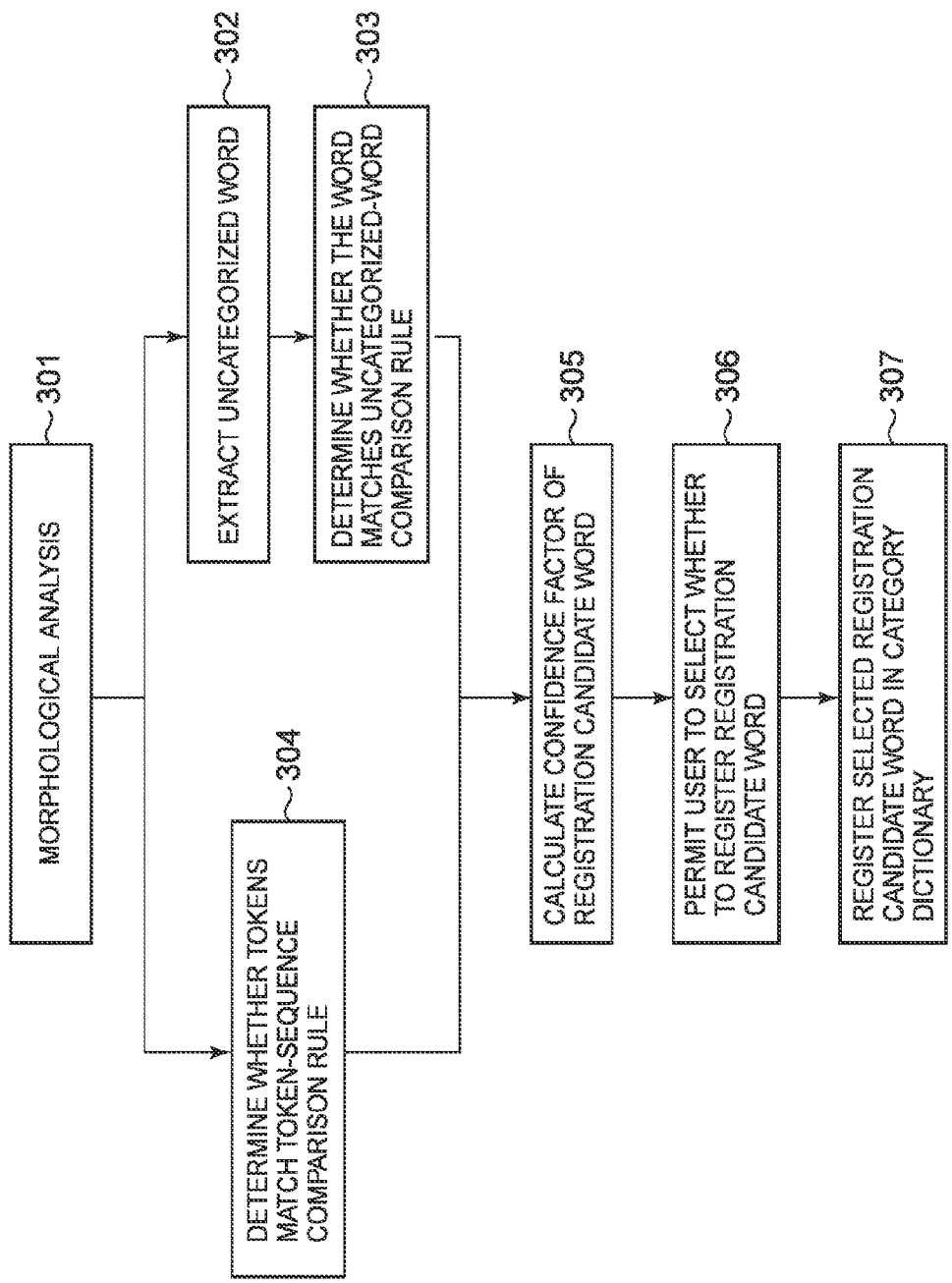
FIG. 3 is a diagram illustrating a flowchart for creating a terms dictionary with named entities or terminologies included in text data according to the embodiment of the present invention.

FIG. 3 shows an example of a flowchart for creating a terms dictionary with named entities or terminologies included in text data according to the embodiment of the present invention.

In step 301, the morphological analysis unit 100 performs a morphological analysis of the sentences in the input text data in response to an input of the text data 1000 and outputs token sequence data with respect to each sentence as a result of the morphological analysis. The token sequence data 1100 is output.

In step 302, the category distinguishing unit 200 extracts uncategorized words which do not math the entries in the category dictionary 1200 with respect to all tokens in the token sequence data 1100. Alternatively, the category distinguishing unit 200 compares all tokens in the token sequence data 1100 with the entries in the classification category dictionary 1225 and in the nontarget category dictionary 1250 and then extracts uncategorized words which do not match any entries. The extracted uncategorized words are output as an uncategorized-word list 1300.

In step 303, the uncategorized-word comparing unit 300 compares the each uncategorized word in the uncategorized-word list 1300 with the uncategorized-word comparison rule 1400 and determines whether the uncategorized word matches the uncategorized-word comparison rule 1400. Then, the uncategorized-word comparing unit 300 outputs an uncategorized word which matches the uncategorized-word comparison rule 1400 as a registration candidate word 1700.

In step 304, the token-sequence comparing unit 400 sequentially reads tokens in the token sequence data 1100, compares the tokens with the token-sequence comparison rule 1500, and determines whether the tokens each match the token-sequence comparison rule 1500. Subsequently, the token-sequence comparing unit 400 determines whether each entry of the matching token sequence exists in the nontarget token-sequence list 1600. Unless the entry exists in the nontarget token-sequence list 1600, the token-sequence comparing unit 400 outputs the token sequence as a registration candidate word 1700.

The computer system (denoted by 10 in FIG. 1A) is able to perform the process of steps 302 to 303 and the process of step 304 in parallel with each other.

In step 305, the confidence factor calculation unit 500 rearranges the registration candidate words 1700 into a convenient order from the viewpoint of determining the registration into the classification category by using the information in the external dictionary 1800. Then, the rearranged registration candidate words are output as registration candidate words with confidence factors 1900. Step 305 is an arbitrary step and therefore the control may proceed directly to step 306 described later from step 303 or step 304.

In step 306, the permission unit 600 provides at least an interface for permitting the user to select whether to register the registration candidate words in the category dictionary 1200. Alternatively, the permission unit 600 prepares at least an interface for permitting the user to select whether to register the registration candidate words in the classification category dictionary 1225. The interface may include confidence factors. Further, the interface may include the classes of registration candidate words.

In step 307, the registration unit 700 registers a registration candidate word, which is determined to be registered by the user, with a flag indicating that the registration candidate word is selected by the user in the category dictionary 1200. On the other hand, the registration unit 700 registers a registration candidate word, which is determined not to be registered by the user and extracted by the uncategorized-word comparing unit 300, with a flag indicating that the registration candidate word is not selected by the user in the category dictionary 1200. Moreover, the registration unit 700 registers a registration candidate word, which is determined not to be registered by the user and is extracted by the token-sequence comparing unit 400, in the nontarget token-sequence list 1600.

Alternatively, the registration unit 700 registers a registration candidate word, which is determined to be registered by the user, in the classification category dictionary 1225. On the other hand, the registration unit 700 registers a registration candidate word, which is determined not to be registered by the user and is extracted by the uncategorized-word comparing unit 300, in the nontarget category dictionary 1250. Moreover, the registration unit 700 registers a registration candidate word, which is determined not to be registered by the user and is extracted by the token-sequence comparing unit 400, in the nontarget token-sequence list 1600.

The above registration processing enables the number of registration candidate words 1700 to be reduced for the next dictionary registration and supports the operation of creating the classification category dictionary 1225.

As described above, according to the embodiment of the present invention, the configuration described below is adopted to extract only tokens belonging to a specific category from the uncategorized-word list 1300, instead of general words.

In the above embodiment of the present invention, there is used a two-step mechanism including: an automatic step in which a registration candidate word is extracted by the comparison by the uncategorized-word comparing unit 300 and the comparison by the token-sequence comparing unit 400 with respect to the token sequence data 1100; and a manual step in which a human confirms the registration candidate word at semantic level through the permission unit 600 as described above. The use of the two-step mechanism enables the token sequence data 1100 to be checked without exception.

In the description with reference to FIG. 1A, the embodiment has been described giving an example of Japanese text data. Also in cases where the text data 1000 is written in English, the present invention is applicable to the text data.

If the text data 1000 is written in English, the morphological analysis unit 100 gives word class information to each token sequence data. It is because the tokens have already been delimited by a space and it is unnecessary to cut out each token as a morpheme as in Japanese.

If the text data 1000 is written in English, the uncategorized-word comparison rule 1400 is composed as described below. The uncategorized-word comparison rule includes a rule composed of a word unit and a rule composed of a part of the word (namely, a substring).

*paralysis (* 麻痺 in Japanese) is an uncategorized-word comparison rule composed of a regular expression (in this example, the asterisk) and a character string. The asterisk represents an arbitrary character string.

Example of matching
"angioparalysis" and
"crystoparalysis"
Example of unmatching:
"paralyzed"
*plegic* (* 麻痺の in Japanese)
Example of matching:
"quadriplegic handicap"
Example of unmatching:
"quadriplegia"

If the text data 1000 is written in English, the token-sequence comparison rule 1500 is composed as described below. The token-sequence comparison rule 1500 for English text data is a rule for extracting a representation composed of a token sequence (a plurality of tokens) in the same manner as the token-sequence comparison rule 1500 for Japanese text data.

"[a~z]+paralysis" is a token-sequence comparison rule composed of a token sequence including a regular expression and a character string. "+" represents a connection between the preceding token and a token following the token.

Example of matching:
"internus paralysis,"
"anticus paralysis," and
"facial paralysis"

Example of unmatching:
"quadriplegic handicap"

First Embodiment

This embodiment describes a dictionary registration under the "手足麻痺" (paralysis of limbs) category.

In life insurance payment assessment, in some cases it is determined whether or not a symptom description relates to paralysis of limbs. Therefore, a creator of a dictionary for life insurance payment assessment needs to exhaustively check words each including the word "麻痺" (paralysis) to create a dictionary under the classification category related to "手足" (limbs).

The initial states of the resources, the classification category dictionary 1225, the nontarget category dictionary 1250, and the token-sequence list 1600 are null. Further, the uncategorized-word comparison rule 1400 is a rule composed of ".+麻痺" which is a combination of regular expressions and a character string which matches a character string including "麻痺" following an arbitrary character string composed of one or more characters. Here, the regular expression, period (.) represents an arbitrary character other than a new line and the regular expression, plus sign (+) represents a repetition of the previous pattern by once or more times. The token-sequence comparison rule 1500 is a token sequence including a regular expression, "{名詞}" (noun), and a character string, "麻痺" (paralysis).

(1) First-Time Dictionary Registration

In the first-time dictionary registration, text data (a plurality of documents are possible) including "拇指麻痺" (thumb paralysis), "両腕麻痺" (paralysis of both arms), or "顔面麻痺" (facial paralysis) was input to the morphological analysis unit 100. A morphological analysis engine of the morphological analysis unit 100 then cuts out "拇指麻痺," "両腕麻痺," or "顔面麻痺" as a token or a token sequence and outputs token sequence data 1100.

The morphological analysis unit 100 cuts out "両腕麻痺" as two words "両腕麻痺" and cuts out each of "拇指麻痺" and "顔面麻痺" as one word. Therefore, "両腕/麻痺" is a token sequence (a plurality of words) and "拇指麻痺" and "顔面麻痺" each are a token (one word).

Receiving the above token sequence data, the category distinguishing unit 200 extracts "拇指麻痺" and "顔面麻痺" as uncategorized words and adds them to the uncategorized-word list 1300 since "両腕" and "麻痺," "拇指麻痺," and "顔面麻痺" are not registered in any of the classification category dictionary 1225 and the nontarget category dictionary 1250.

The uncategorized-word comparing unit 300 reads the uncategorized-word list 1300 and compares "両腕" and "麻痺", and "拇指麻痺" and "顔面麻痺" with the uncategorized-word comparison rule 1400. As a result of the comparison, the uncategorized-word comparing unit 300 determines "両腕" and "麻痺", and "拇指麻痺" and "顔面麻痺" to be uncategorized words. The token "両腕" of the token sequence "両腕/麻痺" does not include "麻痺" of the above uncategorized-word comparison rule 1400 and therefore is not extracted as a registration candidate word 1700. Similarly, the token "麻痺" of the token sequence "両腕/麻痺" does not match "an arbitrary character string composed of one or more characters" in the above uncategorized-word comparison rule 1400 and therefore is not extracted as a registration candidate word 1700. Therefore, the tokens "拇指麻痺" and "顔面麻痺" which match the uncategorized-word comparison rule 1400 are registration candidate words 1700.

The token-sequence comparing unit 400 reads the token sequence data and compares "拇指麻痺" and "顔面麻痺", and "両腕麻痺" with the token-sequence comparison rule 1500. As a result of the comparison, the token-sequence comparing unit 400 determines "両腕麻痺" (in another expression, "両腕/麻痺") to match the token-sequence comparison rule 1500 and confirms that "両腕麻痺" is not registered in the token-sequence list 1600. Then, the token sequence "両腕/麻痺" which matches the token-sequence comparison rule 1500 and is not registered in the token-sequence list 1600 is extracted as registration candidate words.

Thereafter, the user determined the registration candidate words "拇指麻痺" and "両腕麻痺" to be registered and the registration candidate word "顔面麻痺" not to be registered since the registration candidate word "顔面麻痺" does not belong to the "手足麻痺" category. Therefore, the registration unit 700 registers the registration candidate words "拇指麻痺" and "両腕麻痺" in the classification category dictionary 1225. Moreover, the registration unit 700 registers the registration candidate word "顔面麻痺" in the nontarget category dictionary 1250 since the registration candidate word "顔面麻痺" is an uncategorized word.

(2) Second- and Subsequent-Time Dictionary Registration

In the second- and subsequent-time dictionary registration, text data (a plurality of documents are possible) including "拇指麻痺" (thumb paralysis), "両腕麻痺" (paralysis of both arms), "顔面麻痺" (facial paralysis), or "神経麻痺" (nerve paralysis) was input to the morphological analysis unit 100. A morphological analysis engine of the morphological analysis unit 100 then cuts out the above "拇指麻痺" (a token), "両腕麻痺" (a token), "顔面麻痺" (a token), or "神経麻痺" (a token or a token sequence) as a token or a token sequence and outputs token sequence data 1100.

Receiving the above token sequence data, the category distinguishing unit (200) does not extract "拇指麻痺" and "両腕麻痺" as uncategorized words though they are cut out as tokens since "拇指麻痺" and "両腕麻痺" are registered in the classification category dictionary 1225. Similarly, the category distinguishing unit 200 does not extract "顔面麻痺" as an uncategorized word though it is cut out as a token since "顔面麻痺" is registered in the nontarget category dictionary 1250.

If "神経麻痺" is cut out as a single token, the category distinguishing unit 200 extracts the token "神経麻痺" as an uncategorized word and adds it to the uncategorized-word list 1300 since the token "神経麻痺" is not registered in any of the classification category dictionary 1225 and the nontarget category dictionary 1250. The uncategorized-word comparing unit 300 reads the uncategorized-word list 1300 and compares the token "神経麻痺" with the uncategorized-word comparison rule 1400. As a result of the comparison, the uncategorized-word comparing unit 300 determines the token "神経麻痺" to be an uncategorized word. The token "神経麻痺" which matches the uncategorized-word comparison rule 1400 is a registration candidate word 1700.

If "神経麻痺" is cut out as a token sequence, in other words, as "神経/麻痺," the token-sequence comparing unit 400 reads the token sequence data and compares the token sequence "神経麻痺" with the token-sequence comparison rule 1500. As a result of the comparison, the token-sequence comparing unit 400 determines the token sequence "神経麻痺" (in another expression, "神経/麻痺") to match the token-sequence comparison rule 1500 and confirms that the token sequence "神経麻痺" is not registered in the token-sequence list 1600. Then, the token sequence "神経/麻痺" which matches the token-sequence comparison rule 1500 and is not registered in the token-sequence list 1600 is extracted as registration candidate words 1700.

Thereafter, the user determined the registration candidate word "神経麻痺" not to be registered since the registration candidate word "神経麻痺" does not belong to the "手足麻痺" category.

Therefore, if the word "神経麻痺" is cut out as a token, the registration unit 700 registers the word "神経麻痺" in the nontarget category dictionary 1250. If the word "神経麻痺" is cut out as a token sequence, the registration unit 700 adds "神経/麻痺" to the nontarget token-sequence list 1600.

In this manner, the user does not need to determine the once-determined registration candidate words again in the subsequent dictionary registration processing. Moreover, the user simply needs to determine only tokens or token sequences which match the uncategorized-word comparison rule 1400 or the token-sequence comparison rule 1500 with respect to tokens or token sequences which first appeared. Therefore, according to the embodiment of the present invention, the user simply needs to confirm the tokens or token sequences including "麻痺" extracted as registration candidate words independently of a result of the cutout of morphemes performed by the morphological analysis unit 100.

Figure 4:
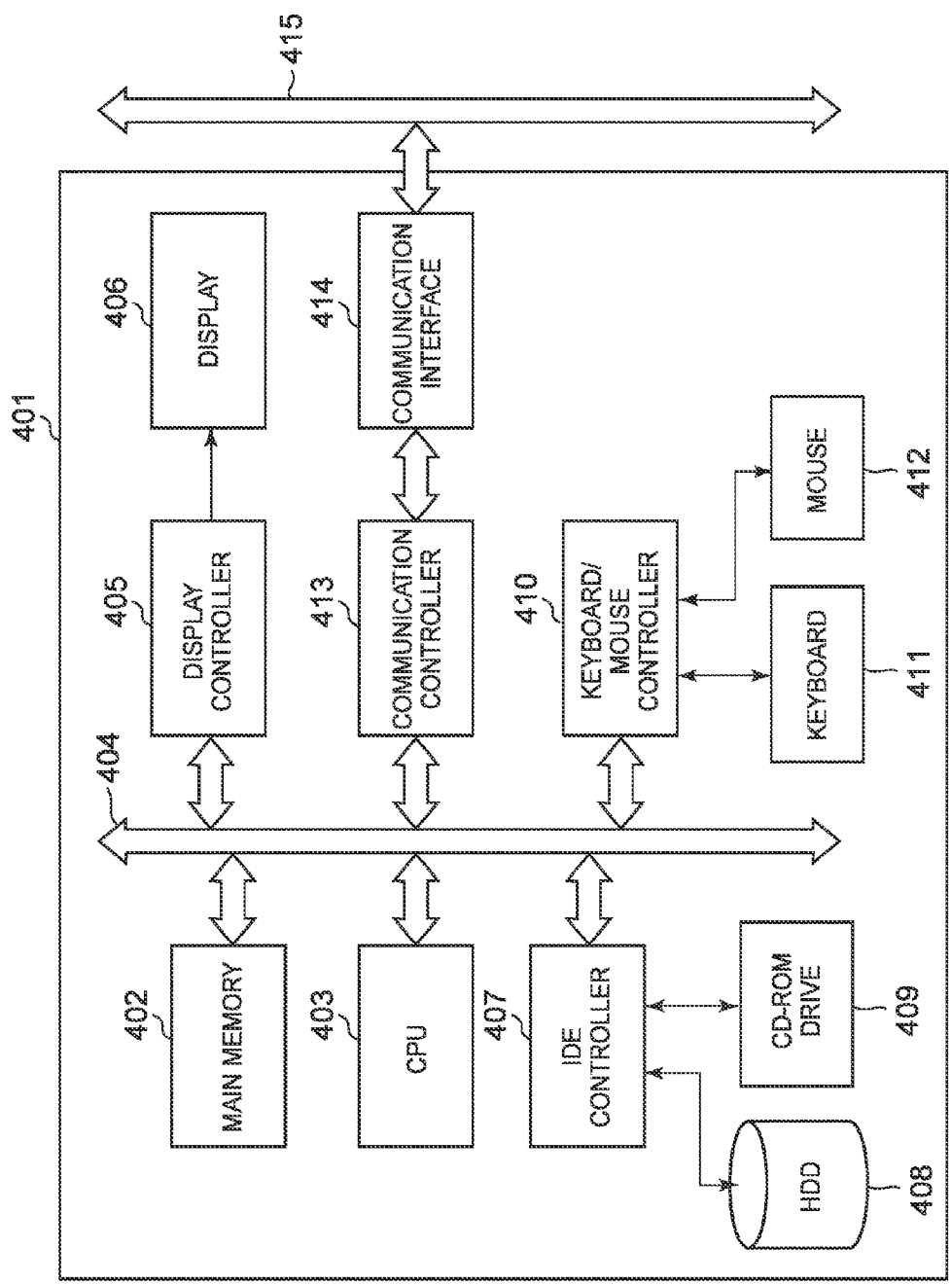
FIG. 4 is a block diagram of a computer system according to the embodiment of the present invention.

FIG. 4 is a block diagram of a computer system according to the embodiment of the present invention.

A computer system 401 according to the embodiment includes a main memory 402 and a CPU 403, which are connected to a bus 404. The CPU 403 is preferably based on a 32-bit or 64-bit architecture such as Intel® Xeon® series, Intel® Core™ series, Intel® ATOM™ series, Intel® Pentium® series, Intel® Celeron® series, AMD Phenom™ series, AMD Athlon™ series, AMD Turion™ series, and AMD Sempron™. A display 406 such as an LCD monitor is connected to the bus 404 via a display controller 405. The display 406 is used to display information on a computer connected to a network via a communication line and information on software under operating conditions in the computer with an appropriate graphic interface. The bus 404 is connected to a hard disk or silicon disk 408 and a CD-ROM/DVD drive or BD drive 409 via an IDE or SATA controller 407.

The hard disk or silicon disk 408 stores the operating system, a computer program according to the embodiment of the present invention, and other programs and data so as to be loadable in the main memory 402.

The CD-ROM/DVD drive or BD drive 409 is used to additionally install a program from a CD-ROM, DVD-ROM, or BD to the hard disk or silicon disk 408, as required. The bus 404 is further connected to a keyboard 411 and a mouse 412 via a keyboard/mouse controller 410.

A communication interface 414 complies with, for example, the Ethernet® protocol. The communication interface 414 is connected to the bus 404 via a communication controller 413 to connect the computer system 401 and a communication line 415 physically, and provide a network interface layer to the TCP/IP protocol of the communication function of the operating system of the computer system 401. The communication line may adopt a cable LAN environment or a wireless LAN environment based on a wireless LAN connection standard such as IEEE802.11a/b/g/n.

While the embodiment of the present invention has been described hereinabove, it will be understood by those skilled in the art that the descriptions of the embodiment are merely examples the invention and that various modifications may be made without departing from the technical scope of the invention.

The invention claimed is:

1. A method of creating a terms dictionary with named entities or terminologies included in text data, comprising:
   acquiring token sequence data via a processing unit by performing morphological analysis for the text data;
   distinguishing tokens of the token sequence data via a processing unit by using a category dictionary to extract uncategorized words;
   comparing each of the extracted uncategorized words with an uncategorized-word comparison rule via a processing unit to extract an uncategorized word matching the uncategorized-word comparison rule as a registration candidate word, wherein the uncategorized-word comparison rule includes a token composed of a first character string and a first regular expression for use in extracting the matching uncategorized word;
   comparing a token sequence of the token sequence data with a token-sequence comparison rule via a processing unit to extract a token sequence matching the token-sequence comparison rule as registration candidate words, wherein the token-sequence comparison rule includes a token sequence including a second character string and a second regular expression for use in extracting the matching token sequence; and
   permitting a user to select whether to register the registration candidate words in the category dictionary via a processing unit.

2. The method according to claim 1, further comprising:
   calculating a confidence factor of each of the registration candidate words, wherein the confidence factor represents a degree of probability with which the registration candidate word is registered in the category dictionary or probability with which the registration candidate word is added to the token-sequence comparison rule.

3. The method of claim 2, wherein the confidence factor is calculated by using information on a number of characters or types of characters.

4. The method of claim 2, wherein the calculating of the confidence factor uses information in a plurality of external dictionaries, which include a technical terminology dictionary and a general terms dictionary, and wherein the calculating of the confidence factor adds more points to a score of the confidence factor in cases where a character string in a token which matches the first or second regular expression exists in a vocabulary of the technical terminology dictionary than in cases where the character string exists in a vocabulary of the general terms dictionary.

5. The method according to claim 2, wherein permitting the user to select whether to register the registration candidate words comprises:
   sorting the registration candidate words according to the confidence factors calculated for each of the registration candidate words; and displaying the sorted registration candidate words on a display device.

6. The method according to claim 1, further comprising:
registering an uncategorized word, which is extracted as the registration candidate word and selected by the user, in the category dictionary.

7. The method according to claim 1, wherein the category dictionary includes a classification category dictionary and a nontarget category dictionary.

8. The method of claim 7, wherein the distinguishing of the tokens of the token sequence data comprises:
distinguishing the tokens of the token sequence data by using the classification category dictionary and the nontarget category dictionary, wherein the classification category dictionary includes tokens registered in the terms dictionary and arbitrarily includes word class information of the tokens and the nontarget category dictionary includes tokens not registered in the terms dictionary and arbitrarily includes the word class information of the tokens.

9. The method of claim 8, wherein the permitting of the user to select whether to register the registration candidate words comprises at least one of:
registering an uncategorized word, which is extracted as the registration candidate word and selected by the user, in the classification category dictionary;
registering an uncategorized word, which is extracted as the registration candidate word and not selected by the user, in the nontarget category dictionary; and
adding the token sequence, which is extracted as the registration candidate words and not selected by the user, in a token-sequence list.

10. The method of claim 8, wherein the permitting of the user to select whether to register the registration candidate words comprises:
registering an uncategorized word, which is extracted as the registration candidate word and selected by the user, in the classification category dictionary.

11. The method of claim 8, wherein the permitting of the user to select whether to register the registration candidate words comprises:
registering an uncategorized word, which is extracted as the registration candidate word and not selected by the user, in the nontarget category dictionary.

12. The method of claim 8, wherein the permitting of the user to select whether to register the registration candidate words comprises:
adding the token sequence, which is extracted as the registration candidate words and not selected by the user, in a token-sequence list.

13. A non-transitory tangible storage medium storing a computer program for creating a terms dictionary with named entities or terminologies included in text data, wherein the computer program when executed causes a computer system to:
acquire token sequence data by performing morphological analysis for the text data;
distinguish tokens of the token sequence data by using a category dictionary to extract uncategorized words;
compare each of the extracted uncategorized words with an uncategorized-word comparison rule to extract an uncategorized word matching the uncategorized-word comparison rule as a registration candidate word, wherein the uncategorized-word comparison rule includes a token composed of a first character string and a first regular expression for use in extracting the matching uncategorized word;
compare a token sequence of the token sequence data with a token-sequence comparison rule to extract a token sequence matching the token-sequence comparison rule as registration candidate words, wherein the token-sequence comparison rule includes a token sequence including a second character string and a second regular expression for use in extracting the matching token sequence; and
permit a user to select whether to register the registration candidate words in the category dictionary.

14. A system for creating a terms dictionary with named entities or terminologies included in text data, the system comprising:
a computer system with a processing unit and further comprising:
a morphological analysis unit for acquiring token sequence data by performing morphological analysis for the text data;
a category distinguishing unit for distinguishing tokens of the token sequence data by using a category dictionary to extract uncategorized words;
an uncategorized-word comparing unit for comparing each of the extracted uncategorized words with an uncategorized-word comparison rule to extract an uncategorized word matching the uncategorized-word comparison rule as a registration candidate word, wherein the uncategorized-word comparison rule includes a token composed of a first character string and a first regular expression for use in extracting the matching uncategorized word;
a token-sequence comparing unit for comparing a token sequence of the token sequence data with a token-sequence comparison rule to extract a token sequence matching the token-sequence comparison rule as registration candidate words, wherein the token-sequence comparison rule includes a token sequence including a second character string and a second regular expression for use in extracting the matching token sequence; and
a permission unit for permitting a user to select whether to register the registration candidate words in the category dictionary.

15. The system according to claim 14, wherein the computer system further comprises:
a confidence factor calculation unit for calculating a confidence factor of each of the registration candidate words, wherein the confidence factor represents a degree of probability with which the registration candidate word is registered in the category dictionary or probability with which the registration candidate word is added to the token-sequence comparison rule.

16. The system according to claim 14, wherein the computer system further comprises:
a registration unit for registering an uncategorized word, which is extracted as the registration candidate word and selected by the user, in the category dictionary.

17. The system according to claim 14, wherein:
the morphological analysis unit when executed acquires word class information corresponding to the respective tokens of the token sequence data; and
the category distinguishing unit when executed does not extract the tokens of the token sequence data in cases where the tokens of the token sequence data and the word class information corresponding to the tokens match the tokens registered in the category dictionary and the word class information corresponding to the tokens, respectively.

18. The system according to claim 14, wherein:
the morphological analysis unit when executed acquires word class information corresponding to the respective tokens of the token sequence data; and
the token-sequence comparing unit when executed does not extract the token sequence of the token sequence data in cases where the token sequence of the token sequence data and the word class information corresponding to the tokens of the token sequence match the token sequence registered in a token-sequence list and the word class information corresponding to the tokens of the token sequence, respectively.

19. The system according to claim 14, wherein:
the morphological analysis unit when executed acquires word class information corresponding to the tokens of the token sequence data;
the category dictionary includes a classification category dictionary and a nontarget category dictionary;
the classification category dictionary includes tokens registered in the terms dictionary and arbitrarily includes the word class information of the tokens; and
the nontarget category dictionary includes tokens not registered in the terms dictionary and arbitrarily includes the word class information of the tokens.

20. The system according to claim 19, wherein:
the category distinguishing unit when executed distinguishes the tokens of the token sequence data by using the classification category dictionary;
the permission unit when executed permits the user to select whether to register the registration candidate words in the classification category dictionary; and
the computer system further comprises a registration unit that when executed registers an uncategorized word, which is extracted as the registration candidate word and selected by the user, in the category dictionary.

* * * * *